Feb. 26, 1952     E. C. MERSEREAU     2,587,059
HAND BRAKE MECHANISM
Filed July 27, 1950     2 SHEETS—SHEET 2
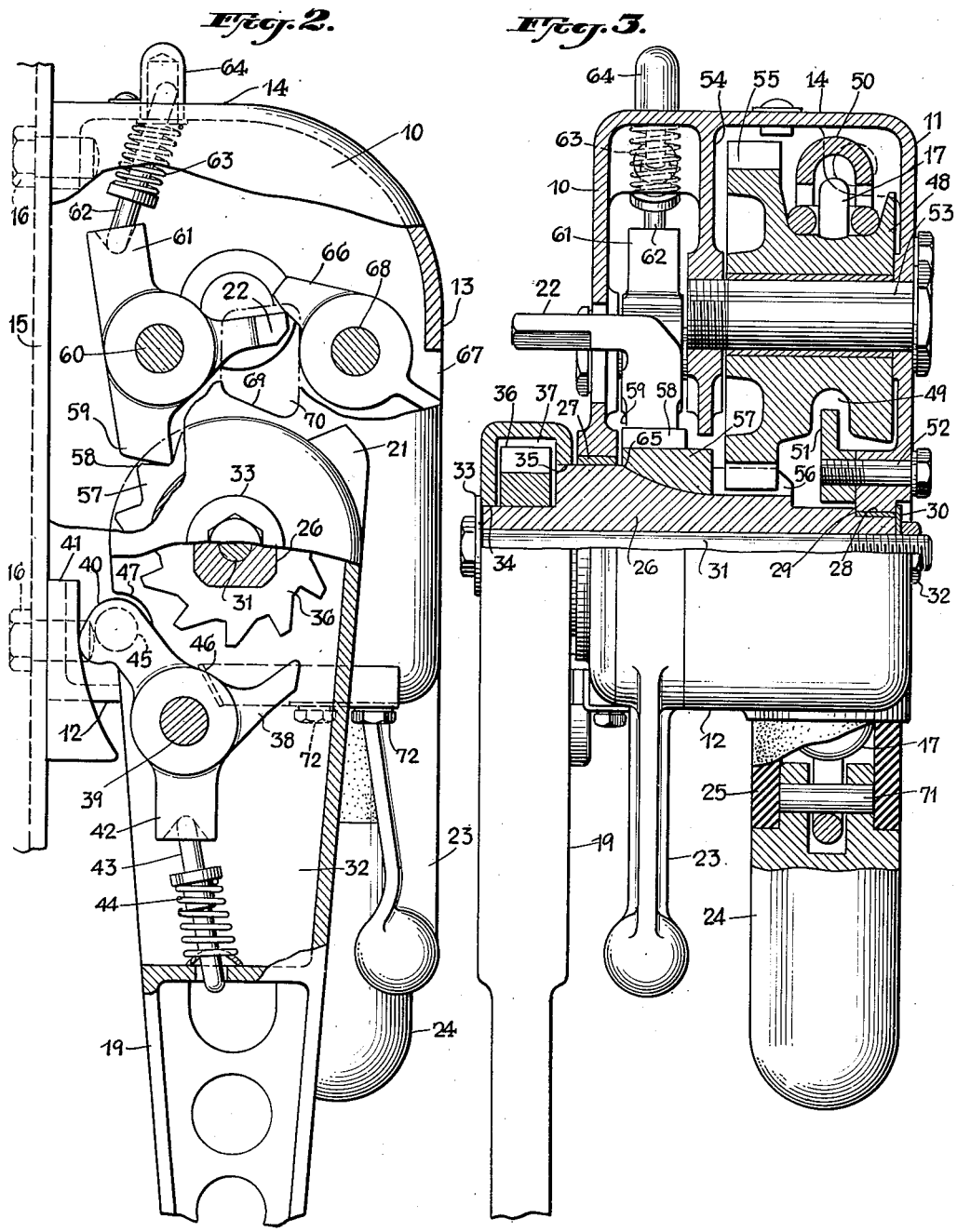
INVENTOR.
EVERARD C. MERSEREAU.
BY
Ward Crosby & Neal
ATTORNEYS.

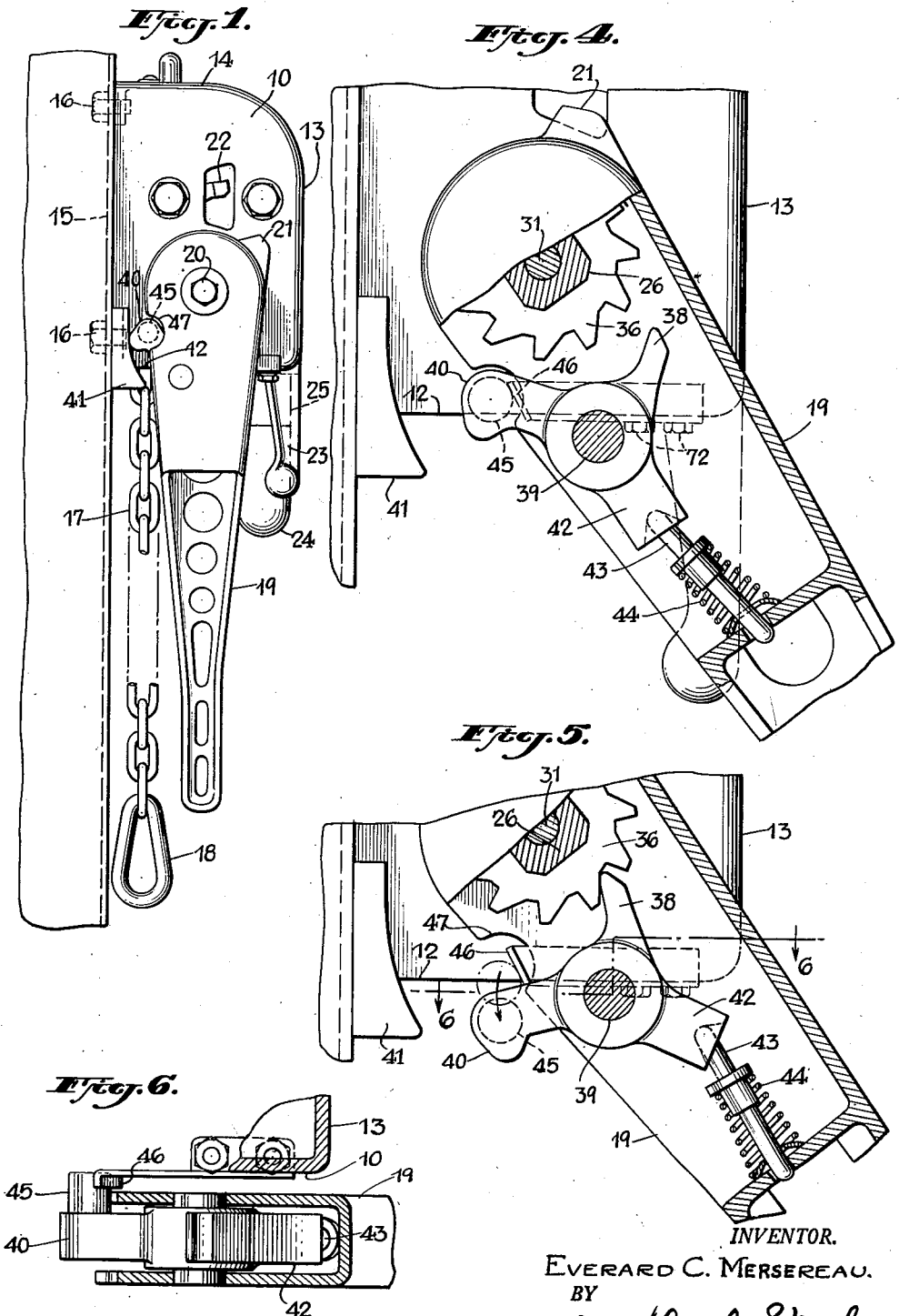

Patented Feb. 26, 1952

2,587,059

UNITED STATES PATENT OFFICE 2,587,059

HAND BRAKE MECHANISM

Everard C. Mersereau, Westfield, N. J., assignor to National Brake Company, Inc., New York, N. Y., a corporation of New York Application July 27, 1950, Serial No. 176,098

15 Claims. (Cl. 74—505)

This invention relates to a hand operated take-up mechanism for the brake rigging of cars and particularly to a hand operated mechanism for the control of brakes of railway cars and the like used for the transportation of passengers, etc.

The hand brake mechanism of this invention is an improvement over the mechanism disclosed in U. S. Patent No. 2,227,315 and has advantages thereover which will hereinafter be described.

After the brakes of a car are set by means of the mechanism described in the above-mentioned patent, they may be released by pulling a hand trip lever which disengages a holding or detent pawl from a detent wheel. The pawl remains disengaged only as long as the trip lever is pulled which means that the operator must hold the lever and wait while the brakes are being released. Furthermore, if the trip lever is returned to its normal position prematurely, the brakes may not be completely released causing undesirable drag on the car and wearing of the brakes.

In accordance with the present invention, the hand operated mechanism is provided with a holding pawl which can rest either in engagement or out of engagement with a detent wheel and the pawl is held in either of these two positions by a spring loaded toggle. The pawl is forced into engagement with the detent wheel by a hand lever used to set the brakes and is disengaged from the wheel by a hand trip lever. With this arrangement, the brakes of the car may be fully released by momentary operation of the trip lever and the brake rigging is unrestrained by the mechanism until the brake setting lever is again operated.

Also in accordance with the present invention, the brake setting lever is coupled to a shaft which controls the tightening of the brake rigging by a ratchet pawl which can rest either in engagement or out of engagement with a ratchet wheel mounted on the shaft and which is held in these two positions by a spring loaded toggle. The pawl is forced into engagement with the ratchet wheel when the setting lever is operated and is disengaged from the ratchet wheel when the lever is restored to its normal or rest position.

The invention includes the novel features, arrangements and combination of parts embodied, by way of example, in the device hereinafter described as illustrating a preferred form of the invention and the invention will be more particularly pointed out in the appended claims.

The invention may be more readily understood by considering the following detailed description in connection with the accompanying drawings, in which:

Fig. 1 is a side elevation view of a hand brake mechanism embodying the invention;

Fig. 2 is an enlarged side elevation view, partly in section, of the hand brake mechanism shown in Fig. 1;

Fig. 3 is an end elevation view, partly in section, of the mechanism shown in Fig. 2;

Figs. 4 and 5 are fragmentary side elevation views, partly in section, of the hand brake mechanism illustrating the operation of the ratchet pawl connected with the brake setting lever of the mechanism; and Fig. 6 is a horizontal cross section view of the mechanism taken along the line 6—6 indicated in Fig. 5.

General arrangement

The enclosing casing which houses the greater number of the movable parts of the hand brake mechanism may be variously constructed but in its preferred form shown in Fig. 1, the housing comprises two longitudinal side walls 10 and 11, a bottom wall 12 connecting the lower ends of the side walls, a front wall 13 connecting the front edges of the side and bottom walls and a top wall 14 connecting the upper edges of the side and front walls. The rear side of this casing is open when the mechanism is detached from a supporting wall but is closed by a wall 15 when the mechanism is installed thereon. The wall 15 is normally the wall of a car whose brakes are to be controlled by the mechanism and the mechanism may be attached to the wall by various means but preferably by a plurality of bolts 16 threaded into the casing and passing through holes in the wall 15.

A chain 17 is attached to the brake rigging of the car by a link 18 and is pulled upwardly when a hand lever 19 is rotated counterclockwise about its pivot point 20. The hand lever 19 is provided with a projecting portion 21 which engages with the arm or tail 22 of a holding pawl within the casing when the hand lever 19 is rotated counterclockwise from the position shown in Fig. 1.

The holding pawl is released by operation of a trip lever having a handle 23 permitting the chain 17 to move in a downward direction. The end of the chain 17 opposite from the end attached to the link 18 is attached to a snubber weight 24 which is cushioned with respect to the housing by a snubber 25.

Chain drum drive

As shown in Figs. 2 and 3, the lower part of the casing encloses a main operating or controlling shaft 26 which has its opposite ends extending through the side walls 10 and 11 of the casing and journaled in bearings 27 and 28 so that the shaft is permitted to turn about an axis extending across the casing. Endwise movement of the shaft relative to the casing is prevented by means of an outwardly facing shoulder 29 formed thereon adjacent to the bearing 28 and engaging with the inner side of the adjacent side wall 11 of the casing and by means of a thrust washer 30 secured to the end of the shaft by means of a bolt 31 extending through the center of the shaft and a nut 32 threaded on the end of the bolt 31.

The hand lever 19 is held on the end of the shaft 26 by engagement of its inner side with the adjacent wall 10 of the casing and by a retaining washer 33 held against the outer side of the lever 19 by the bolt 31. The lever 19 bears on the shaft 26 at the points 34 and 35 and is free to rotate with respect to the shaft when a ratchet pawl which will be hereinafter described is disengaged from a ratchet wheel 36 which is enclosed in a chamber 37 formed in the end of the lever 19. The ratchet wheel 36 and the operating shaft 26 are compelled to turn together by providing the end of the shaft carrying the ratchet wheel 36 with a reduced neck, the periphery of which is of substantially square cross section, as shown in Fig. 2. A correspondingly shaped opening is provided in the center of the ratchet wheel 36 so that when the ratchet wheel is mounted on the end of the shaft 26, the wheel and the shaft are positively interlocked.

Within the lower part of the chamber 37 in the hand lever 19, a ratchet pawl 38 is pivotally mounted on a pin 39 which pin is mounted on the wall of the chamber. The pawl 38 is adapted to engage the teeth of the ratchet wheel 36 for turning the ratchet wheel of the shaft 26 when the lever 19 is rotated in a counterclockwise direction, as seen in Fig. 2. When the lever 19 is in the rest position shown in Fig. 2, a releasing tail 40 integral with the pawl 38 strikes an abutment 41 and causes the pawl 38 to become disengaged from the teeth of the ratchet wheel 36. As long as the lever 19 remains in the position shown in Fig. 2, the pawl 38 is held in the position shown by means of the toggle comprising a plunger 43 for applying a force to the pawl at a point remote from its center of rotation and an arm 42 integral with the pawl 38. Plunger 43 is engaged with the end of the arm 42 and is urged against the arm 42 by a spring 44. The releasing tail 40 carries a pin 45 which engages a notch 47 in the lever 19 and which, as will be explained in greater detail in connection with Figs. 4-6, engages a cam 46 mounted on the wall 12 of the casing when the lever 19 is moved from the normal or rest position shown in Fig. 2.

A horizontal arbor or pivot pin 53 is mounted transversely in the upper part of the casing parallel with the operating shaft 26 and is supported at its outer end by the side wall 11 and at its inner end by a partition 54 into which the pin is threaded. A drum 48 is rotatably mounted on the pin 53 and is rotated in the direction necessary for taking up the chain 17 and hence for taking up the brake rigging of the car by means of a driven gear wheel 55 which is preferably formed integrally with the side of the drum 48 adjacent the partition 54. The gear wheel 55 is driven by a driving gear pinion 56 whose teeth are formed integrally with the periphery of the inner part of the operating shaft 26. The gear pinion 56 and the gear wheel 55 may have any suitable ratio so that the power applied to the shaft 26 by means of the hand lever 19 and its associated pawl 38 and ratchet wheel 36 will be multiplied when delivered to the chain and hence to the brake rigging of the car. In the embodiment shown, this ratio is, for example, such that the gear pinion takes two turns for each turn of the gear wheel.

The chain 17 is carried within the casing by the drum 48, and the links of the chain engage with pockets 49 in the drum. Hence, as the drum 48 is rotated, the chain moves with the drum and if the rotation of the drum is clockwise, as viewed from the left in Fig. 3, the link 18 moves in an upward direction. The links of the chain are prevented from riding up out of the pockets 49 by a guide 50, and they are prevented from sticking in the pockets of the drum and hence, winding about the drum, by a stripper 51 mounted on the wall 11 and held in position by a bolt 52 threaded into the stripper.

*Holding mechanism*

Detent means are provided whereby the operating shaft 26 and the drum 48 geared thereto may be advanced step by step and held at the end of each forward step in order to permit the ratchet mechanism associated with the lever 19 to make an idle backward stroke preparatory to making the next following active stroke. As shown in Figs. 2 and 3, this detent mechanism comprises a detent wheel 57 mounted on the operating shaft 26 and provided with an annular row of detent teeth 58 and a holding or detent pawl 59 pivotally mounted on a pin 60 which pin is mounted on the side wall 10 and the internal partition 54. The pawl 59 may be held in either of two rest positions, the pawl being engaged with the teeth of the detent wheel 57 in one of the rest positions and being out of engagement with the detent wheel 57 in the other of the rest positions. The pawl is held in either of these two positions by means of a toggle comprising a plunger 62 for applying a force to the pawl at a point remote from its center of rotation and an arm 61 integral with the pawl. Plunger 62 is engaged with the end of the arm 61 and is urged against the arm 61 by a spring 63. The end of the plunger 62 opposite from the end engaged with the arm 61 pivots in a cap 64 which is mounted in a hole in the wall 14.

Various means may be employed for connecting the detent wheel 57 with the operating or controlling shaft 26 so that these members turn together but the connection is preferably accomplished by prolonging the teeth of the gear pinion 56 which are formed integrally with the operating shaft and inter-engaging the teeth with an annular row of internal teeth formed in the bore of the detent wheel 57. By this means, a very strong and durable connection is formed between the detent wheel and the operating shaft.

In order to prevent the detent wheel 57 from sliding lengthwise on the shaft 26, a stop shoulder 65 which bears against the outer side of the detent wheel 57 is formed on the shaft 26, and the partition 54 extends inwardly from the wall of the casing a distance sufficient to overlap the inner side of the teeth 58 around a portion of the hub of the detent wheel.

When it is desired to release the brakes of the car and hence to release the take-up drum 48, the pwal 59 may be disengaged from the teeth 58 of the detent wheel 57 by means of a trip lever having a trip finger 66. The trip lever extends through a slot 67 in the casing and has its upper end pivotally mounted on a pin 68 within the casing. The pin 68 extends from the wall 10 to the partition 54 and is supported by these members in holes provided therein. The trip finger 66 engages with the releasing arm or tail 22 of the pawl 59 so that when the trip lever is rotated about the pin 68 by pulling the handle 23, the pawl may be disengaged from the teeth 58 of the detent wheel 57.

When the pawl 59 is in the position shown in Fig. 2, the pawl is engaged with the teeth 58 and hence the detent wheel 57 and the operating shaft 26 cannot be rotated in a clockwise direction, as viewed in Fig. 2. However, when the shaft 26 is rotated in a counterclockwise direction by counterclockwise rotation of the hand lever 19, the pawl 59 which is free to rotate in a clockwise direction about the pin 60 rides over the teeth 58. Due to the action of the toggle comprising the arm 61 and the plunger 62 and the spring 63, the pawl 59 is always maintained in contact with the teeth 58 until the pawl 59 is rotated about the pin 60 and amount sufficient to cause the point of contact of the plunger 62 with the end of the arm 61 to move to the right, as seen in Fig. 2, beyond a position in which an extension of the axis of the plunger 62 intersects the center of the pin 60. The pawl may be rotated about the pin 60 by this amount by pulling the handle 23 as far as possible in an outward direction which causes the trip finger 66 to press downwardly on the releasing tail 22. As soon as the toggle has been moved beyond the above-mentioned position, the pawl will snap into a position in which the pawl 59 is disengaged from the teeth 58 and the tail 22 strikes the end 69 of the aperture 70 in the wall 10. When the pawl is disengaged from the teeth 58, the detent wheel 57 and hence the shaft 26 are free to move in either direction. This means that the drum 48 is also free to rotate and it will, therefore, rotate in a direction such that the chain and the brake rigging are fully released.

Upon release of the drum 48 and the chain 17, the drum will rotate and the chain will move until the snubber 25, which is made of resilient material, such as rubber, strikes the wall 12 of the casing. In the fully released position, the snubber weight 24 presses against the snubber 25 because of the pull exerted on the weight 24 by the chain 17 which is fastened thereto by a pin 71 which extends through a link in the chain and a pair of holes in the end of the snubber weight.

When the hand lever 19 is operated for the purpose of applying the brakes of the car, the projection 21 on the end of the lever 19 strikes the tail 22 which is resting against the end 69 of the hole 70 in the wall 10. As the operator continues to rotate the lever 19, the projection 21 which has an inclined front face causes the tail 22 to move in an upward direction and hence causes the pawl 59 to rotate about the pin 60. When the pawl 59 reaches a position beyond the position at which an extension of the axis of the plunger 62 intersects the center of the pin 60, the pawl 59 is snapped into engagement with the teeth 58 of the detent wheel 57. The pawl 59 then prevents clockwise rotation of the shaft 26 during operation of the hand lever 19 in the manner heretofore explained.

*Operation of hand lever pawl*

Referring to Figs. 4, 5 and 6, the engagement of the pawl 38 with the ratchet wheel 36 upon movement of the hand lever 19 will be described in greater detail. In the normal or rest position, the pawl 38 is in the position shown in Fig. 2. However, when the hand lever 19 is rotated to the position shown in Fig. 4, the pin 45 on the tail 40 strikes against the cam 46 which is mounted on the walls of the casing by means of bolts 72 which are threaded into the wall 12 of the casing. As the hand lever 19 is further rotated in the counterclockwise direction, the pin 45 is forced in a downward direction and the pawl 38 is rotated about the pin 39. Rotation of the pawl 38 continues as the hand lever 19 is rotated until finally the plunger 43 is moved to a position to the right of a position in which an extension of the axis of the plunger 43 intersects the center of the pin 39. At this time, the pawl 38 snaps into engagement with the teeth of the ratchet wheel 36, as shown in Fig. 5, and the pin 45 moves out of engagement with the cam 46. As shown in Fig. 6, the pin is of such a length that it clears the wall 10 of the casing.

As long as the lever 19 is not returned to a position where the tail 40 strikes the abutment 41, the pawl 38 remains in engagement with the teeth of the ratchet wheel 36. The pawl 38 will, therefore, impart counterclockwise motion to the wheel 36 but because of the fact that the pawl 38 is only resiliently held against the teeth of the wheel 36 and because of the shape of the teeth on the wheel 36, the lever 19 may be rotated in a clockwise direction, as seen in Fig. 4, even though the shaft 26 and hence the wheel 36 do not turn in a clockwise direction. Thus, the shaft 26 may be given a series of partial turns by reciprocating the lever 19.

After the lever 19 has been reciprocated a number of times sufficient to tighten the chain 17 and as the lever is returned to the normal or rest position shown in Figs. 1 and 2, the tail 40 strikes the abutment 41 and rotates the pawl 38 about the pin 39. When the rotation of the pawl 38 has proceeded to a point such that the position of the toggle comprising the arm 42 and the plunger 43 is to the left of a position in which the axis of the plunger 43 intersects the center of the pin 39, the pawl 38 will snap into a position in which the pin 45 engages the notched portion 47 of the lever 19.

*Take-up and release of chain*

The method of operation of the hand mechanism of my invention may be briefly outlined as follows:

(1) Assuming that the mechanism has previously been released and that the hand lever 19 and the handle 23 are in the positions shown in Figs. 1 and 2, the tail 22 of the pawl 59 will be in engagement with the end 69 of the aperture 70, the pawl 59 will be out of engagement with the teeth 58 of the detent wheel 57 and the pawl 38 will be in the position shown in Fig. 2.

(2) An operator desiring to operate the mechanism, then grasps the lever 19 and rotates it in the counterclockwise direction, as viewed in Figs. 1 and 2.

(3) The projection 21 at the end of the lever 19 strikes the tail 22 on pawl 59 and causes the pawl ot rotate about the pin 60 and engage the teeth 58 of the detent wheel 57.

(4) The pin 45 strikes the cam 46 and causes the pawl 38 to rotate about the pin 39 and to engage with the teeth of the wheel 36.

(5) As soon as the pawl 38 engages the teeth of the wheel 36, the shaft 26 commences to turn causing rotation of the driving gear pinion 56 and rotation of the driven gear wheel 55 associated with the drum 48. Rotation of the drum 48 causes the chain 17 to pull the link 18 in an upward direction and hence because the link 18 is connected to the brake rigging of the car, the brakes of the car are applied.

(6) If rotation of the shaft 26 through approximately 180° is not sufficient to fully apply the brakes, the lever 19 is returned to a position such that the tail 40 almost touches the abutment 41. Of course, the lever may also be returned to the normal position shown in Figs. 1 and 2 or any other position but ordinarily it would be returned to a position in which the tail 40 is near the abutment 41. After the lever 19 is returned to the aforementioned position, the lever is again rotated counterclockwise producing further tightening of the chain 17. This process of returning the lever 19 to a position where the tail 40 almost touches the abutment 41 and subsequently rotating the lever 19 counterclockwise is repeated until the desired tightening or application of the brakes is obtained.

(7) When the operator wishes to release the brakes, he grasps the handle 23 and pulls is outwardly away from the wall of the casing.

(8) Pulling of the handle 23 causes the trip finger 66 to push the tail 22 downwardly toward the end 69 of the aperture 70. The pawl 59 rotates about the pin 60 and disengages from the teeth 58 of the detent wheel 57. The shaft 26 is thus released permitting the shaft 26 and the drum 48 to rotate freely. The drum then rotates and releases the chain 17 which travels until its motion is arrested by striking of the snubber 25 against the casing.

It will be noted from the above that as soon as the trip lever handle 23 is pulled as far as possible in the outward direction, the pawl 59 disengages from the detent wheel teeth 58 and snaps into a fully released position so that it is no longer necessary to hold the handle 23 in a releasing position. In other words, the handle 23 after momentary operation may be returned to the rest position shown in Figs. 1 and 2 and the chain and hence the brakes will continue to be released.

Also, it will be seen that the holding pawl 59 is automatically engaged with the detent wheel 57 soon after the lever 19 is moved from the rest position because of the engagement of the projection 21 with the tail 22. It is, therefore, unneecssary for an operator of the mechanism to set any pawls or to take any action to set the brakes other than to rotate the hand lever 19.

Furthermore, it will be observed that even though there is no spring urging the pawl 38 into engagement with the ratchet wheel 36 when the lever 19 is in the normal or rest position and during the first portion of the movement of the lever 19, the pawl 38 automatically engages the wheel 36 soon after the lever 19 is moved from the rest position.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed as new and desired to be secured by Letters Patent of the United States is:

1. A hand operated take-up mechanism comprising a detent wheel member, a holding pawl member having two rest positions, said pawl member being engaged with said wheel member in one of said positions and being out of engagement with said wheel in the other of said positions, means for holding said pawl member in said positions upon movement thereto, stationary means for mounting one of said members, means for rotatably mounting the other of said members, a rotatable take-up drum connected to the rotatably mounted one of said members, a hand lever connected to said drum and adapted to rotate said drum and said rotatably mounted member, and means operated by said hand lever for moving said pawl member into engagement with said wheel member.

2. A hand operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said positions, a hand lever connected to said drum for rotating said drum and means operated by said hand lever for moving said pawl into engagement with said wheel.

3. A hand operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said positions and a hand lever connected to said drum for rotating said drum and engageable with said pawl upon movement of said lever for moving said pawl into engagement with said wheel.

4. A hand operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said positions, a trip lever for moving said pawl out of engagement with said wheel, a hand lever connected to said drum for rotating said drum and means operated by said hand lever for moving said pawl into engagement with said wheel.

5. A hand operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said positions, a trip lever engageable with said pawl for moving said pawl out of engagement with said wheel and a hand lever connected to said drum for rotating said drum and engageable with said pawl for moving said pawl into engagement with said wheel.

6. A hand operated take-up mechanism for the brake rigging of cars comprising a rotatable take-up drum; means for holding said drum comprising a detent wheel rotatably connected with said drum, a stationary support, a holding pawl rotatably mounted on said support and having two rest positions, said pawl being engaged with said wheel in one of said positions and being out of engagement with said wheel in the other of said positions, and a toggle for holding said pawl in said positions comprising means engaged with said pawl at a point remote from the center of rotation thereof for applying a force thereto; means for rotating said drum and for moving said pawl into engagement with said wheel comprising a hand lever drivingly connected with said drum and means operable by said lever for rotating said pawl into said one position; and means for releasing said drum comprising a trip lever engageable with said pawl for rotating said pawl into said other position.

7. A hand operated take-up mechanism for the brake rigging of cars comprising a rotatable take-up drum; means for holding said drum comprising a detent wheel rotatably connected with said drum; a stationary pin, a holding pawl rotatably mounted on said pin and having two rest positions, said pawl being engaged with wheel in one of said positions and being out of engagement with said wheel in the other of said positions, and a toggle for holding said pawl in said positions comprising a plunger engaged with said pawl at a point remote from the center of rotation thereof and spring means for urging said plunger into engagement with said pawl; means for rotating said drum and for moving said pawl into engagement with said wheel comprising a hand lever drivingly connected with said drum and means operable by said lever for rotating said pawl into said one position; and means for releasing said drum comprising a trip lever engageable with said pawl for rotating said pawl into said other position.

8. A hand operated take-up mechanism for the brake rigging of cars comprising a rotatable take-up drum; means for holding said drum comprising a detent wheel rotatably connected with said drum; a stationary support, a holding pawl rotatably mounted on said support and having two rest positions, said pawl being engaged with said wheel in one of said positions and being out of engagement with said wheel in the other of said positions, and a toggle for holding said pawl in said positions comprising means engaged with said pawl at a point remote from the center of rotation thereof for applying a force thereto; means for rotating said drum comprising a hand lever, a ratchet wheel drivingly connected with said drum, a ratchet pawl mounted on said lever and having two rest positions, said ratchet pawl being engaged with said ratchet wheel in one of said last-mentioned two positions and being out of engagement with said ratchet wheel in the other of said last-mentioned two positions, and means for holding said ratchet pawl in said positions upon movement thereto; means for releasing said drum comprising a trip lever engageable with said holding pawl for rotating said holding pawl into its other position, and means operated by said hand lever for rotating said holding pawl into its one position.

9. A hand operated take-up mechanism comprising a rotatable take-up drum, holding means for preventing rotation of said drum in one direction, means for rotating said drum in the opposite direction comprising a hand lever, a ratchet wheel drivingly connected with said drum, a ratchet pawl mounted on said lever and having two rest positions, said pawl being engaged with said wheel in one of said positions and being out of engagement with said wheel in the other of said positions and means for holding said pawl in said positions upon movement thereto, means connectable with said pawl in a first position of said hand lever for moving said pawl to said one position and means connectable with said pawl in a second position of said hand lever for moving said pawl to said other position.

10. A hand operated take-up mechanism comprising a rotatable take-up drum, holding means for preventing rotation of said drum in one direction, means for rotating said drum in the opposite direction comprising a hand lever, a ratchet wheel drivingly connected with said drum, a ratchet pawl mounted on said lever and having two rest positions, said pawl being engaged with said wheel in one of said positions and being out of engagement with said wheel in the other of said positions, and a toggle for holding said pawl in said positions comprising means engaged with said pawl at a point remote from the center of rotation thereof for applying a force thereto, and means engageable with said pawl in a predetermined position of said hand lever for moving said pawl to said other position.

11. A hand operated take-up mechanism for the brake rigging of cars comprising a rotatable take-up drum, holding means for preventing rotation of said drum in one direction, means for rotating said drum in the opposite direction comprising a hand lever, a ratchet wheel drivingly connected with said drum, a ratchet pawl mounted on said lever and having two rest positions, said pawl being engaged with said wheel in one of said positions and being out of engagement with said wheel in the other of said positions, and a toggle for holding said pawl in said positions comprising a plunger engaged with said pawl at a point remote from the center of rotation thereof and spring means for urging said plunger into engagement with said pawl, stop means engageable with said pawl in the pendant position of said hand lever for moving said pawl to said other position and cam means engageable with said pawl in a second position of said hand lever for moving said pawl to said one position.

12. A hand operated take-up mechanism for the brake rigging of cars comprising a rotatable take-up drum; means for holding said drum comprising a detent wheel rotatably connected with said drum, a stationary pin, a holding pawl rotatably mounted on said pin and having two rest positions, said pawl being engaged with said wheel in one of said positions and being out of engagement with said wheel in the other of said positions, and a toggle for holding said pawl in said positions comprising a plunger engaged with said pawl at a point remote from the center of rotation thereof and spring means for urging said plunger into engagement with said pawl; means for releasing said drum comprising a trip lever engageable with said pawl for rotating said pawl into said other position; and means for rotating said drum and for moving said pawl into engagement with said wheel comprising a hand lever having a projection engageable upon movement of said lever with said pawl for rotating said pawl into said one position, a ratchet wheel drivingly connected with said drum, a ratchet pawl mounted on said lever and having two rest positions, said ratchet pawl being engaged with said ratchet wheel in one of said last-mentioned two positions and being out of engagement with said ratchet wheel in the other of said last-mentioned two positions, and a toggle for holding said ratchet pawl in its two positions comprising a plunger mounted on said lever and engaged with said ratchet pawl at a point remote from the center of rotation thereof and spring means for urging said last-mentioned plunger into engagement with said ratchet pawl.

13. A hand-operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said positions, means for rotating said drum comprising a hand lever, a ratchet wheel drivingly connected with said drum and a ratchet pawl mounted on said lever and having two rest positions, said ratchet pawl being engaged with said ratchet wheel in one of said last-mentioned positions and being out of engagement with said ratchet wheel in the other of said last-mentioned positions, means connectable with said ratchet pawl in a first position of said hand lever for moving said ratchet pawl to said one of its positions, means connectable with said ratchet pawl in a second position of said hand lever for moving said ratchet pawl to said other of its positions, and means operated by said hand lever upon movement of said hand lever to said first position for moving said holding pawl into engagement with said detent wheel.

14. A hand-operated take-up mechanism comprising a rotatable take-up drum, a detent wheel connected to said drum and rotatable thereby, a stationary holding pawl having two rest positions, said pawl being engaged with said wheel in one of said positions and being out of engagement with said wheel in the other of said postions, means for rotating said drum comprising a hand lever, a ratchet wheel drivingly connected with said drum and a ratchet pawl mounted on said lever and having two rest positions, said ratchet pawl being engaged with said ratchet wheel in one of said last-mentioned positions and being out of engagement with said ratchet wheel in the other of said last-mentioned positions, means engageable with said ratchet pawl in a first position of said hand lever for moving said ratchet pawl to said one of its positions, means engageable with said ratchet pawl in a second position of said hand lever for moving said ratchet pawl to said other of its positions, and means engageable with said holding pawl upon movement of said hand lever to said first position for moving said holding pawl into engagement with said detent wheel.

15. A hand-operated take-up mechanism for the brake rigging of cars comprising a rotatable take-up drum, holding means for preventing rotation of said drum in one direction, means for rotating said drum in the opposite direction comprising a hand lever, a ratchet wheel drivingly connected with said drum, a ratchet pawl mounted on said lever and having two rest positions, said pawl being engaged with said wheel in one of said positions and being out of engagement with said wheel in the other of said positions and a toggle for holding said pawl in said positions, stop means engageable with said pawl in the pendant position of said hand lever for moving said pawl to said other position and cam means engageable with said pawl in a second position of said hand lever for moving said pawl to said one position.

EVERARD C. MERSEREAU.

REFERENCES CITED

The following references are of record in the file of this patent:

UNITED STATES PATENTS

| Number | Name | Date |
|--------|------|------|
| 1,807,466 | Birkenmaier | May 26, 1931 |
| 2,179,674 | Stolpe | Nov. 14, 1939 |
| 2,227,315 | Mersereau | Dec. 31, 1940 |
| 2,289,137 | Matter | July 7, 1942 |
| 2,341,775 | Hawk | Feb. 15, 1944 |
| 2,505,946 | Dath | May 2, 1950 |